United States Patent

[11] 3,574,911

| [72] | Inventor | William G. Penoyar<br>Detroit, Mich. |
|---|---|---|
| [21] | Appl. No. | 885,720 |
| [22] | Filed | Dec. 17, 1969 |
| [45] | Patented | Apr. 13, 1971 |
| [73] | Assignee | Milling Specialties, Inc.<br>Detroit, Mich.<br>Continuation of application Ser. No.<br>707,679, Feb. 23, 1968, now abandoned. |

[54] CUTTER AND INSERTS THEREFOR
11 Claims, 6 Drawing Figs.
[52] U.S. Cl. ..................................... 29/95,
29/96, 29/105
[51] Int. Cl. ....................................... B26d 1/00,
B26d 1/12
[50] Field of Search.......................... 29/95, 96,
105, 105.1, 97, 103

[56] References Cited
UNITED STATES PATENTS

| 1,939,490 | 12/1933 | Dixon............................. | 29/105X |
| 2,693,020 | 11/1954 | Pelphrey ....................... | 29/105 |
| 3,133,339 | 5/1964 | Ribich............................ | 29/103 |
| 2,706,848 | 4/1955 | Riley.............................. | 29/105 |

FOREIGN PATENTS

| 319,309 | 2/1957 | Switzerland................... | 29/103 |

*Primary Examiner*—Harrison L. Hinson
*Attorney*—Olsen and Stephenson

ABSTRACT: Apparatus for carrying out milling operations comprising an insert-type end mill including a shank at one end for mounting in a milling machine and a cylindrical body portion having tungsten carbide inserts forming the cutting teeth at the other end. The inserts are a throwaway type which are designed to reduce shock during the cutting operation so that deeper cuts can be made than were heretofore practical, thereby permitting high metal removal rates when taking deep cuts as well as in light-facing cuts. The inserts are triangular in shape with each edge being adapted for use as a cutting edge, and each edge being in the form of a modified sign wave so that it is serrated. The waves of each edge are offset or out of phase with the waves of the other two edges so that the peaks of one edge cover the troughs of the other edges. Three such inserts are used, and indicia is present in each insert to enable the operator, when installing the inserts, to properly arrange them so that succeeding inserts around the periphery of the cylindrical body portion of the end mill have different ones of their edges outermost.

Patented April 13, 1971
3,574,911
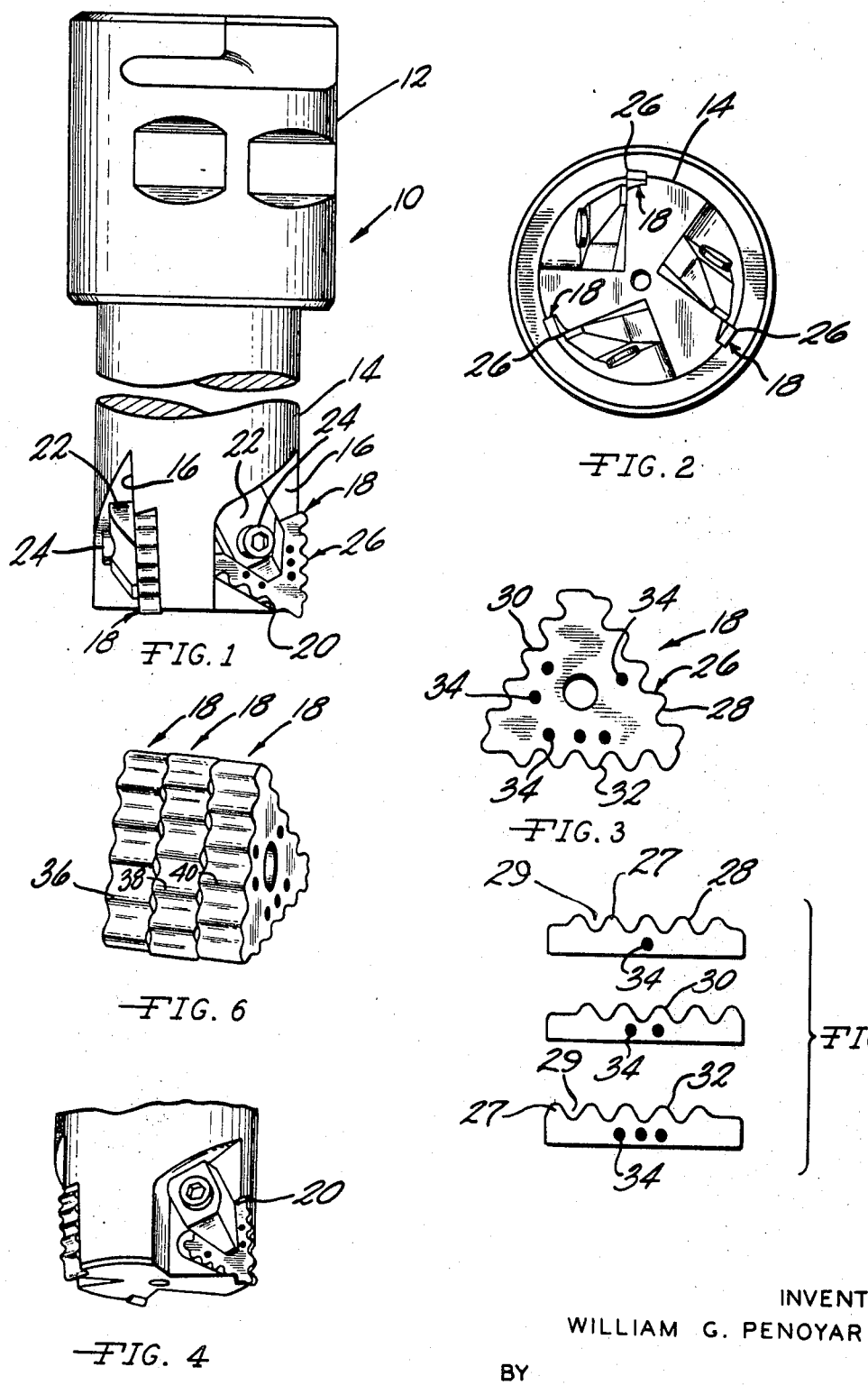
INVENTOR
WILLIAM G. PENOYAR
BY
*Olsen and Stephenson*
ATTORNEYS

CUTTER AND INSERTS THEREFOR

CROSS REFERENCE TO RELATED APPLICATION

This application is a continuation of copending application, Ser. No. 707,679 filed Feb. 23, 1968 and now abandoned.

BACKGROUND OF THE INVENTION

The present invention relates to rotary cutters of the type used in milling operations, and more particularly to such cutters having indexable tungsten carbide inserts forming the cutting teeth, with the inserts having serrated edges which are out of phase to provide for progressive metal removal as the teeth proceed through the work.

One of the problems encountered when using tungsten carbide inserts as the teeth of milling cutters is that cutting tools of this type are incapable of withstanding a great deal of shock or chatter, and in the past this problem has somewhat limited the usefulness of tungsten carbide in milling operations. Shock and chatter are a function of the length of the tool work interface, or depth of cut. The greater the length of the tool work interface or depth of cut, the greater is the problem with respect to shock and chatter. In order to use tungsten carbide tips successfully in milling operations it has been found necessary when seeking to reach good stock removal rates to use high feeds and light cuts.

While excellent stock removal rates can be achieved in this manner, end-milling operations are less than ideal for fast, light cuts. Such cutting operations as forming shoulders, pockets, recesses and die contouring require close operator control. Given a choice of tools, the operator will invariably prefer the slow but controllable high-speed steel end mill by which he can take a deep, slot cut, sacrificing high metal removal rates to do the job in one pass, rather than several. Thus, the carbide-tipped end mill is normally not used, because of the inability heretofore of the tool to give good performance when making a deep cut.

SUMMARY OF THE INVENTION

The present invention is directed to an improved tungsten carbide insert-type end mill which is constructed and arranged to overcome the shortcomings of the prior art and to enable cutting operations to be carried out with a shock reduction so that cuts substantially deeper than heretofore possible are now practical. This has been accomplished with the present invention by breaking up each cutting edge of the end mill into many small cutting edges. The cutting edges are in the form of modified sine waves with each edge offset from the others.

According to a preferred form of the present invention, a rotary cutter is provided having a cylindrical body with a plurality of notches around its circumference, and a plurality of tungsten carbide inserts are secured in the notches and project radially beyond the circumference to provide radially projecting teeth, each of such teeth having a serrated cutting edge. The serrated cutting edges of the projecting teeth have similar serrations, but each tooth around the circumference has its serrations displaced axially out of phase with the serrations of the next succeeding tooth so that the serrations of one tooth cover the notches of the other teeth. The serrated cutting edges are preferably of sinuous shape. The disclosed inserts are triangular in shape, and indicia appear on the face of each triangular insert for identifying the serrations of each of the edges, but other equilateral polygonal shapes, such as square inserts, can also be used.

Thus, it is the main object of the present invention to provide improved end mill devices which are capable of high metal removal rates while making deep cuts into the workpiece.

Other objects of this invention will appear in the following description and appended claims, reference being had to the accompanying drawing forming a part of this specification wherein like reference characters designate corresponding parts in the several views.

BRIEF DESCRIPTION OF THE DRAWING

FIG. 1 is a front elevational view of an insert-type end mill embodying the present invention;

FIG. 2 is a bottom plan view of the end mill;

FIG. 3 is a front elevational view of one of the tungsten carbide inserts, embodying the present invention;

FIG. 4 is a fragmentary perspective view as seen from below the lower end of the end mill;

FIG. 5 is a schematic arrangement illustrating the out-of-phase relationship of the sinuous cutting edges on the three sides of the insert shown in FIG. 3; and FIG. 6 is a perspective view of three inserts positioned together with different sides adjacent to one another.

DESCRIPTION OF THE PREFERRED EMBODIMENT

Before explaining the present invention in 42 detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

The insert-type end mill or rotary cutter 10 is provided at one end with a conventional shank 12 for mounting in a milling machine or the like, and it has a cylindrical body portion 14 which is notched at the other end, as at 16, to provide seats for the plurality of tungsten carbide inserts 18. Preferably, the notched portions 16 will include socket portions 20 having a configuration for receiving and supporting an insert 18 in an operative cutting position. A plurality of clamps 22 are secured in place by means of the screws 24 for holding the inserts 18 in their operative positions, as can be seen best in FIGS. 1 and 2. When in operative positions, each of the inserts 18 will have a cutting edge projecting outside the circumference of the cylindrical portion 14 to provide a radially projecting tooth.

The inserts 18 are illustrated as being formed in a triangular shape so as to provide cutting edges 26 on each side of the triangular configuration. The cutting edges 26 are serrated, having serrations 27 separated by notches or troughs 29. Stated otherwise, the cutting edges 26 are in the form of modified sine waves or sinuous configurations which are the same, but offset or out of phase from one another so that if the edges are projected to a common plane, such a as that which is illustrated in FIG. 5, the wave peaks 27 of one edge cover the troughs 29 of the other edges. Thus, the sinuous cutting edges 28, 30 and 32 can be seen in FIG. 5 in association with their identifying indicia 34, and it can be seen that the wave peaks are offset uniformly from one another so that during the cutting operation each peak and one of its sides will have an offset cutting path from the corresponding peak and side of the other two sinuous cutting edges. This can be seen by the arrangement shown in FIG. 6 where three of the inserts 18 are positioned against one another and it will be seen that the peaks 36, 38 and 40 are offset so as to provide broken cutting edges for each of the inserts 18.

When mounting the inserts 18 in the socket portions 20, the operator will use the indicia 34 to assist him in arranging the inserts so that one of the inserts 18 will have its edge 28 in the cutting position, the second insert will have its cutting edge 30 in the operative cutting position, and the third insert will have its cutting edge 32 in the operative cutting position. When so arranged, each edge is offset or out of phase with the other two edges so that the peaks of one side cover the troughs of the other. This has the effect of breaking up the conventional cutting edge into many small cutting edges in which no insert cuts the same path as another. It is recognized that this operation will leave a peripheral finish which is threadlike, but a conventional cutting tool may then be used in the end mill for a finishing cut. However, the usefulness of the present invention has been demonstrated in that it enables a substantially deeper rough cut to be made at high cutting speeds so that high metal removal rates can be realized when making such deep cuts.

It will be recognized that the present invention also permits the operator to use each insert in a total of six arrangements, that is, each side can be used with respect to each of the indicia on one face, and the insert can then be reversed so that the opposite face provides three similar cutting edges, and since there are three cutting edges relative to each surface, a total of six cutting edges are provided for each insert. Thus, each of these cutting edges can be used before the insert is discarded or thrown away. Furthermore, the removability of inserts 18 enables sharpening of insert edges by grinding the side faces of the inserts, as contrasted to the more expensive and difficult "side wheel" grinding required when a sinuous edge must be sharpened in place.

It is to be importantly noted that in the cutter 10 of this invention, the inserts 18 are identical, thereby facilitating manufacture and use of the cutter 10. This is enabled by making the edge 28 so that the peaks and troughs therein are symmetrical with respect to the ends of the edge 28 and making the edges 30 and 32 so that they are the obverse of each other. In other words, the insert 10 on the opposite side of edge 30 is edge 32.

I claim:

1. A cutter comprising a cylindrical body having a plurality of insert seats s around its circumference, a plurality of indexable inserts secured in said seats, each of said inserts being in the shape of an equilateral polygon having a plurality of sides, each side of said polygon having an edge capable of functioning as a tooth on said body, each of said edges being of a serrated construction so that it has serrations separated by notches, at least one of said serrated edges being out of phase with at least one of the other edges so that if projected to a common plane the serrations of one edge cover at least a portion of the notches of the other edge, said inserts being secured in said seats so that the edges thereon project radially beyond said body circumference to provide radially projecting teeth at least two of which have the projecting edges thereon out of phase.

2. A cutter according to claim 1 wherein each of said serrated cutting edges is of a sinuous wave configuration.

3. A cutter according to claim 2 wherein the number of sides of each insert corresponds to the number of said seats extending once about said circumference, and the wave configuration of each insert side conforms to the shape of a different one of the projecting teeth.

4. A cutter according to claim 1, wherein each of said seats includes a socket portion having a configuration for receiving and supporting one of said inserts in an operative cutting position, and means to secure said insert in the socket portion.

5. A cutter according to claim 1, wherein each of said inserts is formed of tungsten carbide.

6. A cutter according to claim 1, wherein each of said inserts has indicia thereon to identify each side thereof.

7. An insert for a milling cutter, said insert having the shape of an equilateral polygon, each side of said polygon having an edge adapted to be the cutting edge of a tooth of said cutter, each of said cutting edges being of a serrated construction so that it has serrations separated by notches, and at least one of said serrated edges being out of phase with at least one of the other serrated edges so that if projected to a common plane the serrations of one edge cover at least a portion of the notches of the other edge.

8. An insert according to claim 7 wherein each of said serrated cutting edges is of a sinuous wave configuration.

9. An insert according to claim 7 wherein said polygon is formed of tungsten carbide.

10. An insert according to claim 7 wherein said polygon has indicia thereon identifying the cutting edges thereof.

11. An insert according to claim 8 wherein said polygon has at least three cutting edges each of which is out of phase with all of the other cutting edges.